(12) United States Patent
Gu

(10) Patent No.: US 9,578,222 B2
(45) Date of Patent: Feb. 21, 2017

(54) OPTICAL NAVIGATION DEVICE

(71) Applicant: PIXART IMAGING INC., Hsin-Chu County (TW)

(72) Inventor: Ren-Hau Gu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 14/991,350

(22) Filed: Jan. 8, 2016

(65) Prior Publication Data
US 2016/0124520 A1 May 5, 2016

Related U.S. Application Data

(62) Division of application No. 13/684,864, filed on Nov. 26, 2012, now Pat. No. 9,354,717.

(30) Foreign Application Priority Data

Feb. 20, 2012 (TW) .............................. 101105473 A

(51) Int. Cl.
| | | |
|---|---|---|
| G06F 3/03 | (2006.01) | |
| H04N 5/33 | (2006.01) | |
| H04N 5/225 | (2006.01) | |
| G06F 1/32 | (2006.01) | |

(52) U.S. Cl.
CPC .......... *H04N 5/2256* (2013.01); *G06F 1/3259* (2013.01); *G06F 3/0317* (2013.01); *G06F 3/0325* (2013.01); *H04N 5/332* (2013.01); *Y02B 60/1253* (2013.01)

(58) Field of Classification Search
CPC ...................................................... G06F 1/3259
See application file for complete search history.

(56) References Cited

U.S. PATENT DOCUMENTS

| | | |
|---|---|---|
| 8,531,436 B2 | 9/2013 | Lai et al. |
| 2005/0162375 A1 | 7/2005 | Koay et al. |
| 2005/0199783 A1* | 9/2005 | Wenstrand et al. ... G06F 1/3203 250/214.1 |
| 2006/0033015 A1 | 2/2006 | Feldmeier et al. |
| 2006/0203101 A1 | 9/2006 | Silsby |
| 2010/0103107 A1 | 4/2010 | Chao et al. |

FOREIGN PATENT DOCUMENTS

| | | |
|---|---|---|
| CN | 101073047 A | 11/2007 |
| TW | 200606395 A | 2/2006 |
| TW | 201202652 A1 | 1/2012 |

* cited by examiner

*Primary Examiner* — Michael Teitelbaum
(74) *Attorney, Agent, or Firm* — Hauptman Ham, LLP

(57) ABSTRACT

There is provided an optical navigation device including at least one light source, an image sensor and a processing unit. The light source illuminates a work surface in a first brightness value and a second brightness value. The image sensor receives reflected light from the work surface and outputs a first image frame corresponding to the first brightness value and a second image frame corresponding to the second brightness value. The processing unit calculates a differential image of the first image frame and the second image frame and identifies an operating state according to the differential image.

11 Claims, 4 Drawing Sheets

OPTICAL NAVIGATION DEVICE

CROSS REFERENCE TO RELATED APPLICATION

This application is a divisional of U.S. application Ser. No. 13/684,864, filed Nov. 26, 2012, and claims the priority benefit of Taiwan Patent Application Serial Number 101105473, filed on Feb. 20, 2012, the full disclosures of which are incorporated herein by reference.

BACKGROUND

1. Field of the Disclosure

This disclosure generally relates to an interactive device and, more particularly, to an optical navigation device.

2. Description of the Related Art

The conventional optical mouse generally includes a light source, an image sensor and a processing unit, and is configured to be operated on a work surface by a user. The light source is configured to illuminate the work surface. The image sensor receives reflected light from the work surface to output image frames. The processing unit is configured to calculate a displacement of the optical mouse with respect to the work surface according to the image frames outputted from the image sensor, e.g. according to the correlation between the image frames.

In the above conventional optical mouse, when the processing unit identifies that an image quality of the image frames captured by the image sensor is poor, the displacement is not outputted so as to avoid cursor jitter or operating error. For example, when the optical mouse is lifted from the work surface by the user, the image quality is degraded. However, the image quality is generally degraded by the interference from noise or ambient light such that the processing unit may not be able to correctly output desired trace of the mouse and furthermore may not be able to enter a sleep mode. In other words, an expected accuracy can not be achieved by determining whether to stop outputting the displacement only according to the image quality.

According, the present disclosure further provides an optical navigation device that can effectively eliminate the interference from noise and ambient light and an operating state can be accurately calculated even thought it is operated on a work surface having a low reflectance so as to improve the operating accuracy of the optical navigation device.

SUMMARY

It is an object of the present disclosure to provide an optical navigation device configured to be operated on a work surface that may accurately identify whether it is lifted from a work surface so as to enter a sleep mode smoothly.

It is another object of the present disclosure to provide an optical navigation device configured to be operated on a work surface that may accurately identify an operating state even though it is operated on a work surface having a low reflectance.

The present disclosure provides an optical navigation device including at least one light source, a light control unit, an image sensor and a processing unit. The light source is configured to illuminate the work surface. The light control unit is configured to control the light source to illuminate in a first brightness value and a second brightness value. The image sensor receives reflected light from the work surface and outputs a first image frame corresponding to the first brightness value and a second image frame corresponding to the second brightness value. The processing unit is configured to calculate an average intensity difference between the first image frame and the second image frame and to identify an operating state according to a comparison result of comparing the average intensity difference with at least one threshold.

The present disclosure further provides an optical navigation device including at least one light source, an image sensor and a processing unit. The light source is configured to illuminate the work surface in a first brightness value and a second brightness value. The image sensor receives reflected light from the work surface and outputs a plurality of first image frames corresponding to the first brightness value and a plurality of second image frames corresponding to the second brightness value. The processing unit is configured to control the light source to illuminate the work surface, to calculate differential images of the first image frames and the second image frames temporally adjacent to each other, to calculate a displacement according to the differential images, and to identify an operating state according to an average intensity of the differential images.

The present disclosure further provides an optical navigation device including at least one light source, an image sensor and a processing unit. The light source is configured to illuminate the work surface in a first brightness value and a second brightness value. The image sensor receives reflected light from the work surface and outputs a first image frame corresponding to the first brightness value and a second image frame corresponding to the second brightness value. The processing unit is configured to control the light source to illuminate the work surface, to calculate a differential image of the first image frame and the second image frame, and to control the optical navigation device to enter a sleep mode according to an average intensity of the differential image.

In an aspect, the processing unit further normalizes the average intensity difference (or the differential image) with an exposure parameter, wherein the exposure parameter may be at least one of a drive intensity of the light source, an exposure time and an image gain, so as to improve the identification accuracy.

In an aspect, the processing unit further identifies the operating state according to the average intensity difference associated with the illumination of the light source having different features and a threshold, wherein said different features may be emitting light of different wavelengths, or emitting coherent light and non-coherent light.

In an aspect, the processing unit may control (directly or through the light control unit) one light source to monotonically change its brightness value and identify whether the average intensity difference (or the average intensity) is changed corresponding to the brightness value so as to improve the identification accuracy by double-checking, wherein the operating state is identified as a lift state when the processing unit identifies that the average intensity difference is not changed corresponding to the changing of the brightness value.

In an aspect, the processing unit may further monotonically change an exposure parameter (e.g. an exposure time) of the image sensor and identify whether the average intensity difference (or the average intensity) is changed corresponding to the exposure parameter so as to improve the identification accuracy by double-checking, wherein the operating state is identified as a lift state when the processing unit identifies that the average intensity difference is not changed corresponding to the changing of the exposure time.

In the optical navigation device of the present disclosure, when the processing unit identifies that the average intensity difference is smaller than the at least one threshold, it indicates that the optical navigation device may be lifted by a user; therefore the processing unit controls the optical navigation device to enter a sleep mode to avoid possible mistakes. In addition, to further improve the identification accuracy, it is able to utilize a different light source, to monotonically change a brightness value of the light source or to monotonically change an exposure parameter to double check the operating state.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
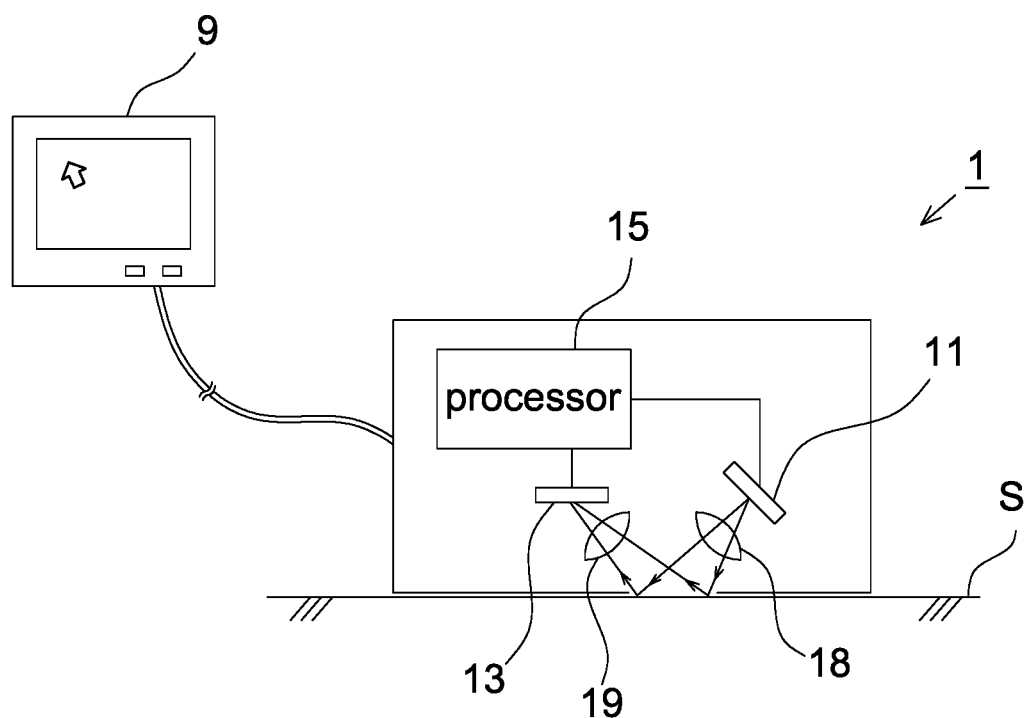
FIG. 1 shows a schematic diagram of the optical navigation device according to an embodiment of the present disclosure.

Referring to FIG. 1, it shows a schematic diagram of the optical navigation device according to an embodiment of the present disclosure. The optical navigation device 1 is configured to be operated by a user on a work surface S for detecting a motion, e.g. a displacement or a speed, with respect to the work surface S. The motion is transmitted to an electronic device 9 having a display to control an application executed by the electronic device 9 or a movement of a cursor shown on the display.

The optical navigation device 1 includes at least one light source 11, an image sensor 13 and a processing unit 15. In other embodiments, the optical navigation device 1 may further include at least one optical component 18 configured to adjust an illumination area of the light source 11 and an optical component 19 configured to adjust the sensing efficiency of the image sensor 13, wherein structures of the optical components 18 and 19 do not have any limitation. The light source 11 may be a light emitting diode or a laser diode, and is configured to emit light of a predetermined center wavelength, preferably emitting infrared light or invisible light. The image sensor 13 may be a CCD image sensor, a CMOS image sensor or other sensors configured to detect images. The processing unit 15 may be a processor capable of processing image data without any limitation.

Figure 2:
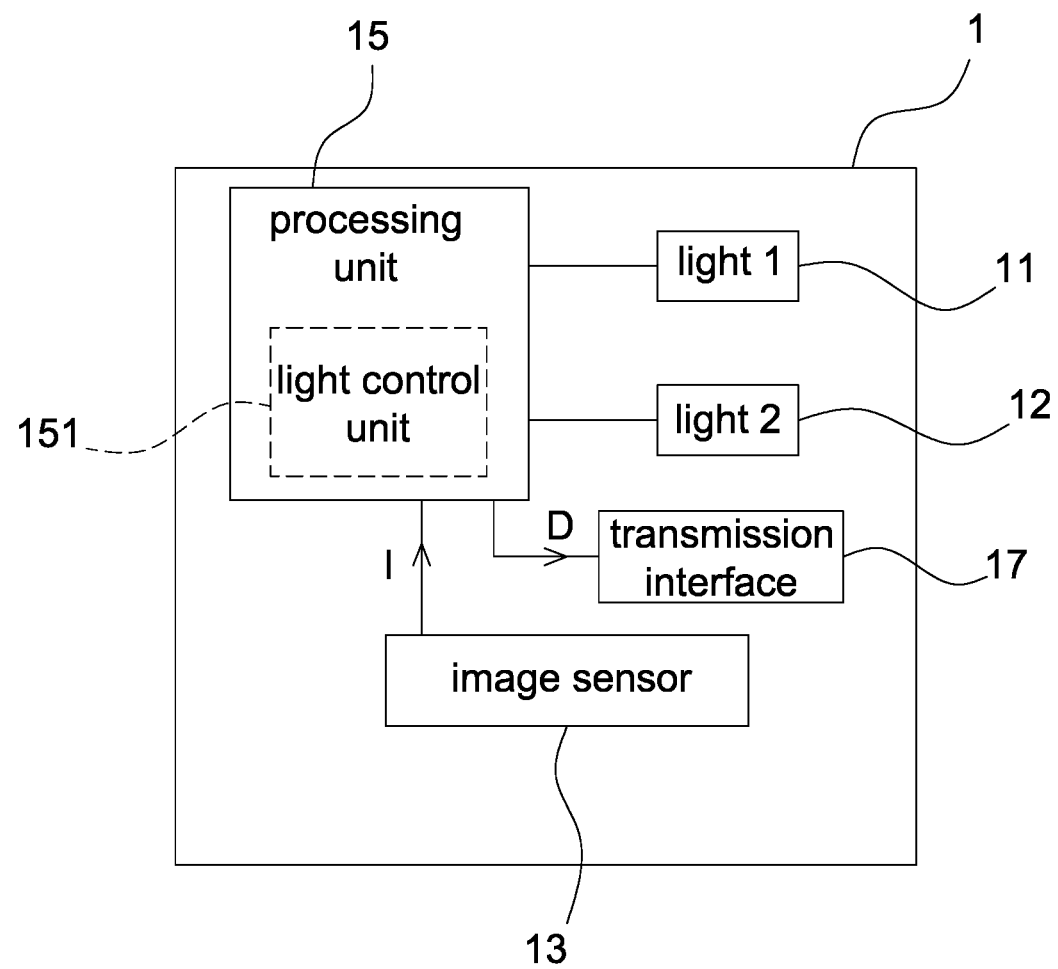
FIG. 2 shows a schematic block diagram of the optical navigation device according to an embodiment of the present disclosure.

Referring FIGS. 1 and 2, FIG. 2 shows a schematic block diagram of the optical navigation device according to an embodiment of the present disclosure. The optical navigation device 1 includes a first light source 11, a second light source 12, the image sensor 13, the processing unit 15 and a transmission interface 17. In this embodiment, the optical navigation device 1 may include only one light source, e.g. the first light source 11, according to different applications.

The light sources 11 and 12 illuminate the work surface S in a first brightness value and a second brightness value, wherein the first brightness value is different from the second brightness value. For example, the first brightness value is larger than the second brightness value, and the second brightness value may be zero brightness or non-zero brightness. In this embodiment, the first light source 11 and the second light source 12 may have different illuminating features; for example, the first light source 11 and the second light source 12 may emit light of different wavelengths, or one of the first light source 11 and the second light source 12 is a coherent light source and the other one is a non-coherent light source.

The image sensor 13 receives reflected light from the work surface S and outputs a first image frame $I_1$ corresponding to the first brightness value and a second image frame $I_2$ corresponding to the second brightness value. Preferably, the image sensor 13 alternatively outputs the first image frame $I_1$ and the second image frame $I_2$ when operating continuously.

The processing unit 15 is configured to control the light sources 11 and 12 to illuminate the work surface S, to calculate a differential image of the first image frame $I_1$ and the second image frame $I_2$ temporally adjacent to each other, to calculate an average intensity of the differential image (i.e. an average intensity difference of the first image frame $I_1$ and the second image frame $I_2$), to calculate a displacement according to the differential image (e.g. according to the correlation between two differential images), and to identify an operating state according to the average intensity of the differential image (e.g. according to a comparison result of comparing the average intensity or the average intensity difference with at least one threshold), wherein the operating state may include a normal state in which the optical navigation device 1 is being operated on the work surface S and a lift state in which the optical navigation device 1 is being lifted by a user.

In one embodiment, the processing unit 15 identifies the comparison result of comparing the average intensity (or the average intensity difference) with at least one threshold so as to identify the operating state. For example, when the average intensity is larger than the threshold, the optical navigation device 1 is in a normal state; that is, the image sensor 13 can still receive enough reflected light from the work surface S. However, when the average intensity is smaller than the threshold, the optical navigation device 1 is in a lift state; that is, the image sensor 13 can not receive enough reflected light. When the processing unit 15 identifies a lift state, the processing unit 15 controls the optical navigation device 1 to enter a sleep mode and stop outputting a displacement D. The displacement D is normally sent to the electronic device 9 wired or wirelessly through the transmission interface 17, wherein the transmission interface 17 may be wired or wireless interfaces well known to the art.

In another embodiment, the processing unit 15 further normalizes the average intensity (or the average intensity difference) with an exposure parameter so as to increase the identification accuracy, wherein the exposure parameter may be at least one of a drive intensity of the light source, an exposure time and an image gain. In one embodiment, the drive intensity of the light source may be a driving current or a driving voltage of the light source. The processing unit 15 identifies the operating state by identifying a comparison result of comparing a normalized average intensity (or a normalized average intensity difference) with at least one threshold. In this embodiment, the normalization may be implemented by dividing the average intensity (or the average intensity difference) by the exposure parameter.

In another embodiment, the optical navigation device 1 may further include a light control unit 151 configured to control the light source 11 and/or 12 to illuminate in the first brightness value and the second brightness value, wherein the light control unit 151 may be included in the processing unit 15 (as shown in FIG. 2) or separated from the processing unit 15 without any limitation. In other words, in this embodiment the processing unit 15 may controls the illumination of the light source 11 and/or 12 directly or through the light control unit 151.

Figure 3:
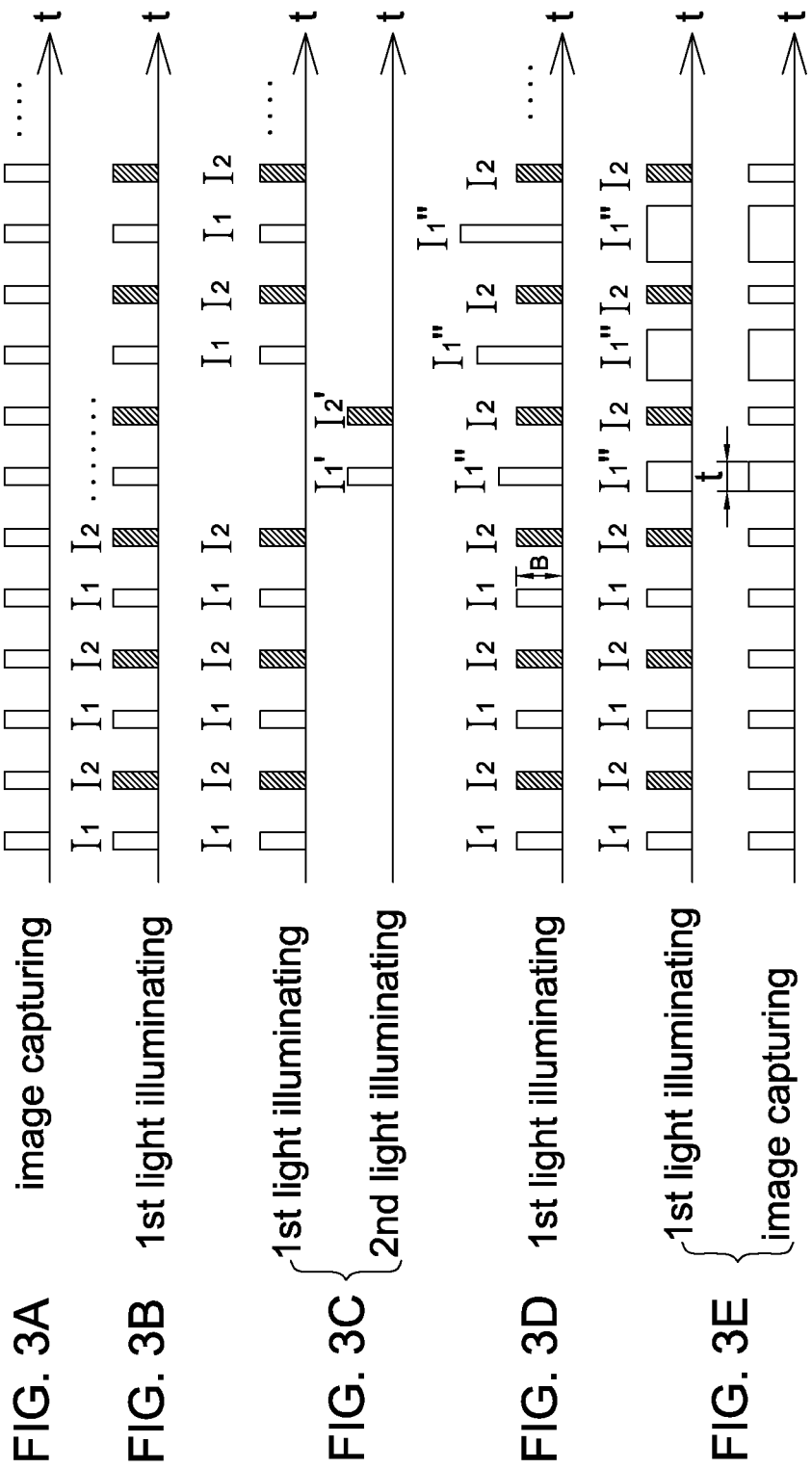
FIGS. 3A-3E show operational schematic diagrams of the optical navigation device according to the embodiment of the present disclosure.

Referring to FIGS. 3A-3E, they show operational schematic diagrams of the optical navigation device 1. FIG. 3A shows a schematic diagram of the image capturing of the image sensor 13, e.g. capturing image frames at a fixed sampling frequency; FIG. 3B shows a schematic diagram of the illumination of the first light source 11; FIG. 3C shows a schematic diagram of the illumination of the first light source 11 and the second light source 12 in another embodiment; FIG. 3D shows a schematic diagram of the illumination of the first light source 11 in another embodiment; and FIG. 3E shows a schematic diagram of the illumination of the first light source 11 and the image capturing of the image sensor 13 in another embodiment; wherein the illumination of the first light source 11 and the second light source 12 corresponds to the image capturing of the image sensor 13.

Figure 4:
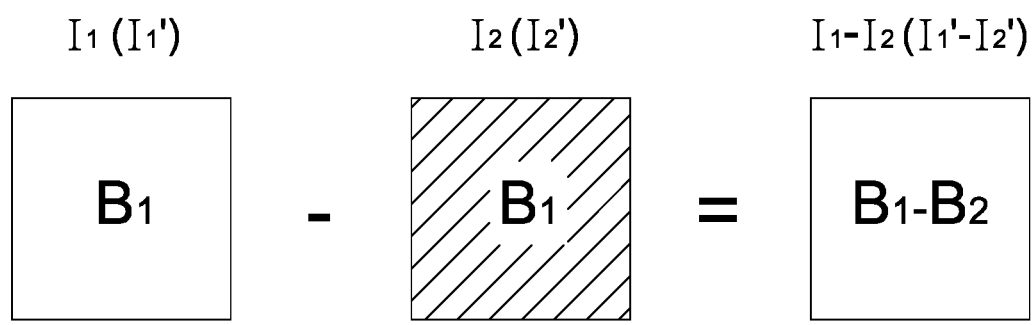
FIG. 4 shows a schematic diagram of calculating a differential image by the optical navigation device according to the embodiment of the present disclosure.

Referring to FIGS. 3A, 3B and 4, in this embodiment the optical navigation device 1 includes only one light source (e.g. the first light source 11 or the second light source 12), and the first light source 11 is taken as an example herein. The processing unit 12 controls (directly or through the light control unit 151) the first light source 11 to illuminate the work surface S in a first brightness value and a second brightness value. The image sensor 13 receives reflected light from the work surface S and outputs first image frames $I_1$ corresponding to the first brightness value and second image frames $I_2$ corresponding to the second brightness value. The processing unit 15 calculates a differential image $(I_1-I_2)$ of the first image frames $I_1$ and the second image frames $I_2$ temporally adjacent to each other, calculates a displacement according to the differential image $(I_1-I_2)$, and identifies an operating state according to an average intensity $(B_1-B_2)$ of the differential image $(I_1-I_2)$, wherein the average intensity (or the average intensity difference) may be calculated by: (1) calculating a first intensity $B_1$ of the first image frame $I_1$ and a second intensity $B_2$ of the second image frame $I_2$ at first and then calculating a difference (or an average intensity difference) of the first intensity $B_1$ and the second intensity $B_2$; or (2) calculating the differential image $(I_1-I_2)$ at first and then directly calculating the average intensity $(B_1-B_2)$ of the differential image $(I_1-I_2)$. When the average intensity $(B_1-B_2)$ is smaller than a predetermined threshold, the operating state is identified as a lift state and the processing unit 15 controls the optical navigation device 1 to enter a sleep mode and/or stop outputting the displacement D.

In the above embodiments, as the interference from ambient light and noise have been eliminated by calculating the differential image, the identification accuracy is improved. Next, to further increase the identification accuracy, the present disclosure further provides various embodiments to confirm whether the optical navigation device 1 is lifted or not. Said confirmation may be performed in the following conditions: the average intensity (or the normalized average intensity) being smaller than the threshold, every predetermined time interval in normal state, or the average intensity (or the normalized average intensity) being smaller than a confirmation threshold, wherein the confirmation threshold may be larger than the predetermined threshold so as to distinguish an uncertain lift state. The merit of the following embodiments is to further increase the identification accuracy since different work surfaces may have different reflectance toward different light sources to degrade the intensity of reflected light thereby decreasing the average intensity and introducing error.

Referring to FIGS. 3A, 3C and 4, in this embodiment the optical navigation device 1 includes the first light source 11 and the second light source 12. In normal operation, the processing unit 15 controls (directly or through the light control unit 151) the first light source 11 to illuminate the work surface S in a first brightness value and a second brightness value. The image sensor 13 receives reflected light from the work surface S and outputs first image frames $I_1$ corresponding to the first brightness value and second image frames $I_2$ corresponding to the second brightness value. The processing unit 15 calculates a first differential image $(I_1-I_2)$ and a first average intensity $(B_1-B_2)$ of the first image frames $I_1$ and the second image frames $I_2$ and identifies whether the first average intensity (or the first intensity difference) is smaller than a first threshold. In the above confirmation conditions (e.g. the first average intensity being smaller than the first threshold), the processing unit 15 controls (directly or through the light control unit 151) the second light source 12 to illuminate the work surface S in a third brightness value and a fourth brightness value. The image sensor 13 receives reflected light from the work surface S and outputs first image frames $I_1'$ corresponding to the third brightness value and second image frames $I_2'$ corresponding to the fourth brightness value. The processing unit 15 calculates a second differential image $(I_1'-I_2')$ and a second average intensity $(B_1-B_2)$ of the first image frames $I_1'$ and the second image frames $I_2'$ and identifies whether the second average intensity $(B_1-B_2)$ is smaller than a second threshold. When the second average intensity (or the second intensity difference) is smaller than the second threshold, the operating state is identified as a lift state and the processing unit 15 controls the optical navigation device 1 to enter a sleep mode and/or stop outputting the displacement D. When the second average intensity (or the second intensity difference) is still larger than the second threshold, the normal mode is maintained in which the operation may be held by using the first light source 11 or changing to use the second light source 12. It is appreciated that the processing unit 15 may control the first light source 11 and the second light source 12 in a reverse sequence. In other words, in this embodiment the processing unit 15 calculates a first average intensity difference corresponding to the illuminating of the first light source 11 and a second average intensity difference corresponding to the illuminating of the second light source 12, and identifies the operating state according to a comparison result of comparing the first average intensity difference with a first threshold and comparing the second average intensity difference with a second threshold; or the processing unit 15 calculates a first differential image corresponding to the illuminating of the first light source 11 and a second differential image corresponding to the illuminating of the second light source 12, and identifies the operating state according to an average intensity of the first differential image and the second differential image. In this embodiment, the first threshold may be identical to or different from the second threshold; the first brightness value may be identical to or different from the third brightness value; and the second brightness value may be identical to or different from the fourth brightness value.

Referring to FIGS. 3A, 3D and 4, in this embodiment the optical navigation device 1 includes only one light source (e.g. the first light source 11 or the second light source 12), and the first light source 11 is taken as an example herein. In normal operation, the processing unit 15 controls (directly or through the light control unit 151) the first light source 11 to illuminate the work surface S in a first brightness value and a second brightness value. The image sensor 13 receives reflected light from the work surface S and outputs first image frames $I_1$ corresponding to the first brightness value and second image frames $I_2$ corresponding to the second brightness value. The processing unit 15 calculates a differential image ($I_1-I_2$) and an average intensity ($B_1-B_2$) of the first image frames $I_1$ and the second image frames $I_2$ and identifies whether the average intensity ($B_1-B_2$) is smaller than a first threshold. In the above confirmation conditions (e.g. the average intensity being smaller than the predetermined threshold), the processing unit 15 controls (directly or through the light control unit 151) the first light source 11 to monotonically change the first brightness value (e.g. herein the first brightness B is monotonically increased but it may be monotonically decreased in another embodiment). The image sensor 13 receives reflected light from the work surface S and outputs first image frames $I_1"$ corresponding to the changed first brightness value and second image frames $I_2$ corresponding to the second brightness value. The processing unit 15 calculates a differential image ($I_1"-I_2$) and an average intensity ($B_1-B_2$) of the first image frames $I_1"$ and the second image frames $I_2$ and identifies whether the average intensity ($B_1-B_2$) is changed corresponding to the first brightness value B. If the average intensity ($B_1-B_2$) is not changed corresponding to the changing of the first brightness value B, the operating state is identified as a lift state and the processing unit 15 controls the optical navigation device 1 to enter a sleep mode and/or stop outputting the displacement D. In another embodiment, the processing unit 15 may further monotonically change the second brightness value of the light source (e.g. the first brightness value being smaller than the second brightness value), and identifies whether the average intensity of the differential image is changed corresponding to the changing of the second brightness value.

Referring to FIGS. 3E and 4, in this embodiment the optical navigation device 1 includes only one light source (e.g. the first light source 11 or the second light source 12), and the first light source 11 is taken as an example herein. In normal operation, the processing unit 15 controls (directly or through the light control unit 151) the first light source 11 to illuminate the work surface S in a first brightness value and a second brightness value. The image sensor 13 receives reflected light from the work surface S and outputs first image frames $I_1$ corresponding to the first brightness value and second image frames $I_2$ corresponding to the second brightness value. The processing unit 15 calculates a differential image ($I_1-I_2$) and an average intensity ($B_1-B_2$) of the first image frames $I_1$ and the second image frames $I_2$ and identifies whether the average intensity ($B_1-B_2$) is smaller than a first threshold. In the above confirmation conditions (e.g. the average intensity being smaller than the predetermined threshold), the processing unit 15 controls the image sensor 13 to monotonically change an exposure parameter thereof (e.g. herein an exposure time t is monotonically increased but it may be monotonically decreased in another embodiment). Meanwhile an interval of the first light source 11 illuminating in the first brightness value is preferably controlled to change corresponding to or keeping longer than the exposure time t. The image sensor 13 receives reflected light from the work surface S and outputs first image frames $I_1"$ corresponding to the first brightness value and second image frames $I_2$ corresponding to the second brightness value. The processing unit 15 calculates a differential image ($I_1"-I_2$) and an average intensity ($B_1-B_2$) of the first image frames $I_1"$ and the second image frames $I_2$ and identifies whether the average intensity ($B_1-B_2$) is changed corresponding to the changing of the exposure parameter. If the average intensity ($B_1-B_2$) is not changed corresponding to the changing of the exposure parameter, the operating state is identified as a lift state and the processing unit 15 controls the optical navigation device 1 to enter a sleep mode and/or stop outputting the displacement D.

In the above embodiments, for example monotonically increased current may be used to drive the light source and if the average intensity is increased correspondingly, it is able to confirm that the optical navigation device is not lifted. Therefore, no matter whether the average intensity is smaller than the threshold, the optical navigation device may keep working and will not enter the sleep mode. In the above embodiments, it is able to fix the light intensity but monotonically increase the exposure parameter, and if the average intensity is increased correspondingly, it is able to confirm that the optical navigation device is not lifted. Therefore, no matter whether the average intensity is smaller than the threshold, the optical navigation device may keep working and will not enter the sleep mode. The above methods may be applied to the optical navigation device including a single light source or a plurality of light sources.

As mentioned above, although the conventional optical mouse can use an image quality to identify whether the optical mouse is lifted by a user, the image quality can be easily influenced by noise and ambient light to introduce error. The present disclosure further provides an optical navigation device (FIGS. 1 and 2) that may eliminate the interference from ambient light through calculating differential images and the operating state can be accurately identified by changing the exposure parameter or using a second light source even though it is operated on a work surface having a low reflectance.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical navigation device, configured to be operated on a work surface, the optical navigation device comprising:
   a first light source and a second light source configured to illuminate the work surface in a first brightness value and a second brightness value;
   an image sensor configured to receive reflected light from the work surface and output a first image frame corresponding to the first brightness value and a second image frame corresponding to the second brightness value; and
   a processing unit electrically coupled to the first and second light sources and the image sensor, and configured to
   control the first and second light sources to illuminate the work surface,
   calculate a first average intensity of a first differential image of the first image frame and the second image frame associated with the illuminating of the first light source and calculate a second average intensity of a second differential image of the first image frame and the second image frame associated with the illuminating of the second light source, and control the optical navigation device to enter a sleep mode when the first average intensity is smaller than a first threshold and the second average intensity is smaller than a second threshold.

2. The optical navigation device as claimed in claim 1, wherein the first threshold is identical to the second threshold.

3. The optical navigation device as claimed in claim 1, wherein the first threshold is different from the second threshold.

4. The optical navigation device as claimed in claim 1, wherein the first light source and the second light source are configured to emit light of different wavelengths.

5. The optical navigation device as claimed in claim 1, wherein one of the first light source and the second light source is a coherent light source and the other one is a non-coherent light source.

6. An optical navigation device, configured to be operated on a work surface, the optical navigation device comprising:
at least one light source configured to illuminate the work surface in a first brightness value and a second brightness value, wherein the first brightness value is larger than the second brightness value, and the second brightness value is zero brightness;
an image sensor configured to receive reflected light from the work surface and output a first image frame corresponding to the first brightness value and a second image frame corresponding to the second brightness value; and
a processing unit electrically coupled to the at least one light source and the image sensor, and configured to
control the light source to illuminate the work surface,
calculate a differential image of the first image frame and the second image frame,
calculate an average intensity of the differential image,
monotonically change the first brightness value when identifying that the average intensity is smaller than a threshold, and
control the optical navigation device to enter a sleep mode when the average intensity is not changed corresponding to the first brightness value.

7. The optical navigation device as claimed in claim 6, wherein the processing unit is further configured to control the optical navigation device to keep working without entering the sleep mode when the average intensity is changed corresponding to the first brightness value.

8. An optical navigation device, configured to be operated on a work surface, the optical navigation device comprising:
at least one light source configured to illuminate the work surface in a first brightness value and a second brightness value, wherein the first brightness value is larger than the second brightness value, and the second brightness value is non-zero brightness;
an image sensor configured to receive reflected light from the work surface and output a first image frame corresponding to the first brightness value and a second image frame corresponding to the second brightness value; and
a processing unit electrically coupled to the at least one light source and the image sensor, and configured to
control the light source to illuminate the work surface,
calculate a differential image of the first image frame and the second image frame,
calculate an average intensity of the differential image,
monotonically change the first brightness value or the second brightness value when identifying that the average intensity is smaller than a threshold, and
control the optical navigation device to enter a sleep mode when the average intensity is not changed corresponding to the first brightness value or the second brightness value.

9. The optical navigation device as claimed in claim 8, wherein the processing unit is further configured to control the optical navigation device to keep working without entering the sleep mode when the average intensity is changed corresponding to the first brightness value or the second brightness value.

10. An optical navigation device, configured to be operated on a work surface, the optical navigation device comprising:
at least one light source configured to illuminate the work surface in a first brightness value and a second brightness value;
an image sensor configured to receive reflected light from the work surface and output a first image frame corresponding to the first brightness value and a second image frame corresponding to the second brightness value; and
a processing unit electrically coupled to the at least one light source and the image sensor, and configured to
control the light source to illuminate the work surface,
calculate a differential image of the first image frame and the second image frame,
calculate an average intensity of the differential image,
monotonically change an exposure parameter of the image sensor when identifying that the average intensity is smaller than a threshold, and
control the optical navigation device to enter a sleep mode when the average intensity is not changed corresponding to the exposure parameter.

11. The optical navigation device as claimed in claim 10, wherein the processing unit is further configured to control the optical navigation device to keep working without entering the sleep mode when the average intensity is changed corresponding to the exposure parameter.

* * * * *